United States Patent
Nagai et al.

(10) Patent No.: US 6,261,349 B1
(45) Date of Patent: *Jul. 17, 2001

(54) IMAGE RECORDING METHOD IMAGE RECORDING APPARATUS AND IMAGE RECORDING ACCELERATION LIQUID

(75) Inventors: Kiyofumi Nagai; Akio Kojima, both of Tokyo; Masato Igarashi; Akiko Konishi, both of Kanagawa; Hiroyuki Mochizuki, Tokyo; Masayuki Koyano; Takanori Tsuyuki, both of Kanagawa; Ikuko Tanaka, Tokyo, all of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/042,690

(22) Filed: Mar. 17, 1998

(30) Foreign Application Priority Data

Mar. 17, 1997 (JP) .................................................. 9-084532

(51) Int. Cl.$^7$ .................................................. C09D 11/02
(52) U.S. Cl. .................................. 106/31.27; 106/31.58; 347/100
(58) Field of Search .............................. 106/31.27, 31.58; 347/100

(56) References Cited

U.S. PATENT DOCUMENTS

| | | | | |
|---|---|---|---|---|
| 5,549,740 | * | 8/1996 | Takahashi et al. | 106/31.43 |
| 5,618,338 | * | 4/1997 | Kurabayashi et al. | 106/31.37 |
| 5,624,484 | * | 4/1997 | Takahashi et al. | 106/31.75 |
| 5,835,116 | * | 11/1998 | Sato et al. | 106/31.43 |
| 5,985,975 | * | 11/1999 | Kurabayashi et al. | 106/31.75 |
| 5,993,524 | * | 11/1999 | Nagai et al. | 106/31.27 |
| 6,027,210 | * | 2/2000 | Kurabayashi et al. | 347/100 |

FOREIGN PATENT DOCUMENTS

| | | |
|---|---|---|
| 52-53012 | 4/1977 | (JP) . |
| 55-65269 | 5/1980 | (JP) . |
| 55-81992 | 6/1980 | (JP) . |
| 55-144172 | 11/1980 | (JP) . |
| 56-86789 | 7/1981 | (JP) . |
| 56-89594 | 7/1981 | (JP) . |
| 56-89595 | 7/1981 | (JP) . |
| 64-63185 | 3/1989 | (JP) . |
| 8-20159 | 1/1996 | (JP) . |
| 8-20161 | 1/1996 | (JP) . |

* cited by examiner

Primary Examiner—Helene Klemanski
(74) Attorney, Agent, or Firm—McDermott, Will & Emery

(57) ABSTRACT

An image recording method for forming an image on a recording material includes the steps of (a) applying to a recording material a colorless or light colored image recording acceleration liquid containing a compound which is capable of making insoluble a coloring agent contained in a recording liquid which comprises the coloring agent and a solvent for dispersing or dissolving the coloring agent, and (b) depositing the recording liquid imagewise on the recording material by ejecting the recording liquid in the form of droplets onto the recording material, the image recording acceleration liquid further containing at least one of surfactants represented by any of formulae (1) to (5) as specified in the specification, and an image formation apparatus for carrying out the above image formation method is provided.

12 Claims, 1 Drawing Sheet

PRINTING PATTERN 1

PRINTING PATTERN 2

PRINTING PATTERN 1

PRINTING PATTERN 2

IMAGE RECORDING METHOD IMAGE RECORDING APPARATUS AND IMAGE RECORDING ACCELERATION LIQUID

BACKGROUND OF THE INVENTION

1. Field of the Invention

The present invention relates to an image recording method and an image recording apparatus, more particularly to an ink jet image recording method and an image recording apparatus therefor. The present invention also relates to an image recording acceleration liquid for use in the image recording method and the image recording apparatus.

DISCUSSION OF BACKGROUND

The ink-jet printers have been widely utilized in recent years because of the advantages of low noise and low running cost, and color printers capable of producing color images on a sheet of plain paper have also been placed on the market.

Conventionally, as coloring agents for use in inks for office-use ink-jet printers, dyes having high solubility are mainly used in order to avoid a problem of clogging of the nozzles of the ink-jet printers with the inks. Recently, however, pigment-containing inks are also increasingly used to prepare posters which are required to be water-resistant and light-resistant. The pigment-containing inks, however, tend to cause the above-mentioned clogging problem, so that it is extremely difficult to maintain the printing reliability of the inks. Furthermore, when high color reproduction performance is required, for instance, as in photographic images and CG (computer graphics), sufficient coloring of cyan and magenta cannot be performed by the pigment-containing inks and accordingly clear images cannot be obtained by the pigment-containing inks.

When a color image is printed on a plain paper, using an ink-jet printer, in order to minimize the spreading of inks in a color boundary portion such as a portion where two colors are superimposed, a surfactant is added to the inks to improve the ink penetration performance as disclosed in Japanese Laid-Open Patent Application 55-65269. In such a case, feathering takes place in characters or fine lines, so that there is devised such a system that an ink with low ink penetration performance is used only when characters are printed in black. However, the control of the spreading of the inks in the color boundaries and the prevention of the occurring of the feathering in characters and fine lines are both still insufficient for use in practice.

In order to solve such problems as mentioned above, a recording material such as plain paper coated in advance with a material for fixing a dye contained in an ink when images are formed on the surface of the recording material with the ink, or a recording material coated with a white pigment or a water-soluble polymer are disclosed, for instance, in Japanese Laid-Open Patient Applications 56-86789, 55-144172, 55-81992, 52-53012 or 56-89594.

Furthermore, in Japanese Laid-Open Patent Application 56-89595, there is proposed an ink-jet recording method in which a recording material is in advance sprayed with a solution of a polymer such as carboxylmethylcellulose, polyvinyl alcohol, or polyvinyl acetate, and printing is performed by spraying an ink to a polymer solution sprayed portion of the recording material. In this ink-jet printing method, the sharpness of the printed image can be improved, but the dryness of the printed image cannot be improved. The result is that the image quality of a color image obtained by this ink-jet printing method cannot be improved so much.

For instance, in Japanese Laid-Open Patent Applications 64-63185, 8-20159 and 8-20161, there is proposed an ink-jet recording method in which an image recording acceleration liquid which contains a compound capable of making insoluble a dye contained in an ink is deposited on the surface of a recording material by an ink-jet method, and then printing is performed by spraying an ink to a portion of the recording material where the image recording acceleration liquid is deposited. In this method, the amount of water deposited on a two-color superimposed portion on the recording material is so large that the spreading of the ink in the color boundaries cannot be sufficiently controlled and it may occur that the ink penetrates the recording material and reaches the back side of the recording material (this phenomenon is hereinafter referred to as "strike through"). Furthermore, this method has a problem that the recording material tends to curl or cockle.

SUMMARY OF THE INVENTION

Accordingly, it is therefore a first object of the present invention to provide an image recording method free of the above-mentioned conventional problems, capable of recording images with high reproduction performance, in particular, of fine line images, with excellent water resistance, high image quality free of ink spreading in color boundaries, and excellent color tone.

A second object of the present invention is to provide an image recording method capable of recording the above-mentioned images at high speed with the improvement of image fixing speed.

A third object of the present invention is to provide an image recording method capable of recording the above-mentioned images with high image density, free of "strike through", with the occurrence of "curling" and "cockling" being minimized.

A fourth object of the present invention is to provide an image recording apparatus capable of performing any of the above-mentioned image recording methods.

A fifth object of the present invention is to provide an image recording acceleration liquid for use in the above-mentioned image recording methods and image recording apparatus.

The first, second, third and fourth objects of the present invention can be achieved by an image recording method for forming an image on a recording material comprising the steps of:

applying to a recording material a colorless or light colored image recording acceleration liquid comprising a compound which is capable of making insoluble a coloring agent contained in a recording liquid which comprises the coloring agent and a solvent for dispersing or dissolving the coloring agent, and depositing the recording liquid imagewise on the recording material by ejecting the recording liquid in the form of droplets onto the recording material, the image recording acceleration liquid further comprising at least one of surfactants represented by any of formulae (1) to (5):

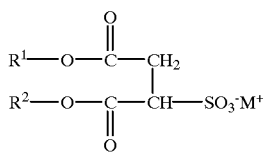

(1)

wherein $R^1$ and $R^2$ are each independently an alkyl group having at least 3 carbon atoms, which may be branched; and $M^+$ is a cation selected from the group consisting of an alkali metal cation, ammonium cation, an alkanolamine cation, a quaternary ammonium cation and a quaternary phosphonium cation,

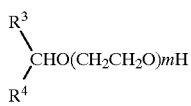

(2)

wherein $R^3$ and $R^4$ are each independently an alkyl group having 5 to 7 carbon atoms, and m is an integer of 5 to 20,

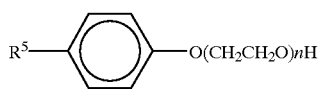

(3)

wherein $R^5$ is an alkyl group having 6 to 14 carbon atoms, which may be branched, and n is an intager of 5 to 20,

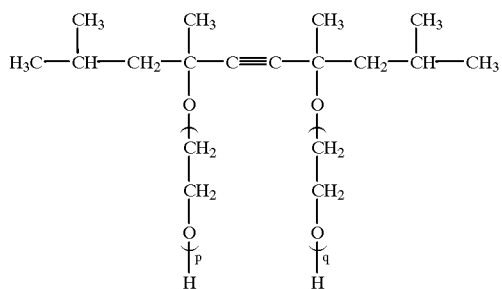

(4)

wherein p and q are each independently an integer of 0 to 20, and

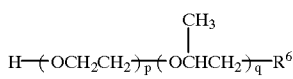

(5)

wherein $R^6$ is an alkyl group having 6 to 14 carbon atoms, which may be branched, and p and q are each independently an integer of 0 to 20.

In the above image recording method, it is preferable that the recording liquid exhibit a contact angle of 90° or less with respect to the recording material after the image recording acceleration liquid has been applied to the recording material.

Further, in the above it is preferable that in the image recording method, the recording liquid be applied in a deposition amount of 0.2 g/m² to 10 g/m² to the recording material.

The fourth object of the present invention can be achieved by an image recording apparatus for forming an image on a recording material comprising:

means for applying to the recording material the colorless or light colored image recording acceleration liquid for controlling the penetration performance and image fixing performance of the recording liquid which comprises a coloring agent and a solvent for dispersing or dissolving the coloring agent, and means for depositing the recording liquid imagewise on the recording material by ejecting the recording liquid in the form of droplets onto the recording material, the image recording acceleration liquid comprising (a) a compound which is capable of making insoluble the coloring agent contained in the recording liquid and (b) at least one of surfactants represented by any of the above-mentioned formulae (1) to (5).

The fifth object of the present invention can be achieved by an image recording acceleration liquid which comprises (a) a compound which is capable of making insoluble a coloring agent contained in a recording liquid comprising the coloring agent and a solvent capable of dispersing or dissolving the coloring agent, (b) at least one of surfactants represented by any of the above-mentions formulae (1) to (5), and (c) a solvent capable of dispersing or dissolving the compound and the surfactant.

DESCRIPTION OF THE PREFERRED EMBODIMENTS

Figure 1:
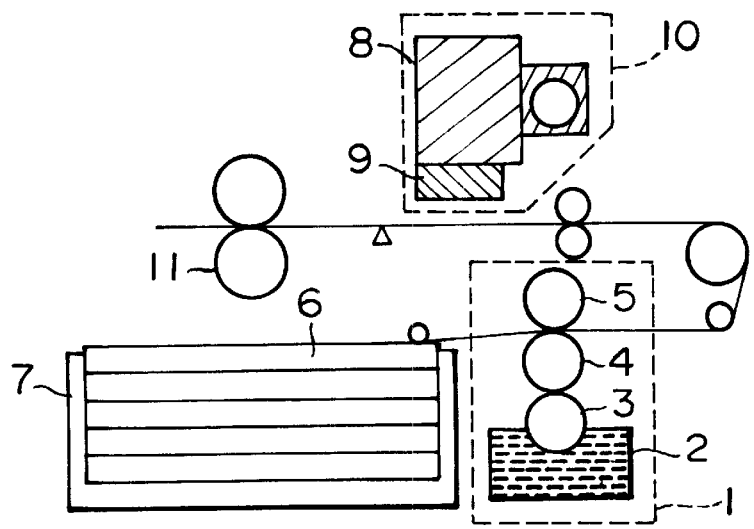
FIG. 1 is a schematic cross-sectional view of an example of the image recording apparatus of the present invention.

As mentioned above, in the present invention, the image recording acceleration liquid is employed, which comprises (a) a compound which is capable of making insoluble a coloring agent contained in a recording liquid comprising the coloring agent and a solvent capable of dispersing or dissolving the coloring agent, (b) at least one of surfactants represented by any of the above-mentioned formulae (1) to (5), and (c) a solvent which is capable of dispersing or dissolving the compound and the surfactant.

According to the present invention, the penetrability of the recording liquid into the recording material such as plain paper can be significantly improved, the coloring agent can be fixed on the surface of the recording material, and high quality images with excellent reproduction of fine lines, free of feathering and ink spreading in color boundaries, with high image density and high water resistance can be obtained by applying to the recording material the above-mentioned image recording acceleration liquid which contains the particular surfactant and the compound which is capable of making the coloring agent in the recording liquid insoluble, and then ejecting the recording liquid in the form of droplets onto the recording material for image formation, in particular, when the recording liquid is adjusted so as to exhibit a contact angle of 90° or less with respect to the recording material after the image recording acceleration liquid has been applied to the recording material.

Furthermore, according to the present invention, as the penetrability of the recording liquid into the recording material is improved, the image fixing dry rate is increased and accordingly high speed recording can be performed.

It is considered that this is because when the recording liquid is deposited on the recording material such as plain paper after the application of the above-mentioned image recording acceleration liquid which contains the particular surfactant and the compound which is capable of making the coloring agent in the recording liquid insoluble, irregular wetting of the surface of the recording material with the recording liquid which is caused by the distribution of a surface sizing agent deposited on the surface of the recording material can be minimized, so that the recording liquid can uniformly penetrate the recording material and at the same time the coloring agent is made insoluble and stays near the surface of the recording material.

It is preferable that the total amount of at least one of the surfactants represented by any of the above-mentioned formulae (1) to (5) that is contained in the image recording acceleration liquid be 0.5 to 80 wt. %, since when the image recording acceleration liquid containing such an amount of the surfactant(s) is applied to the recording material, the contact angle of the recording liquid to be deposited on the recording material can be adjusted so as to be 90° or less.

Of the above surfactants of formulae (1) to (5), a dialkylsulfosuccinate of formula (1) is preferable, and a dialkylsulfosuccinate of formula (1) in which $R^1$ and $R^2$ are each independently a branched alkyl group having 5 to 7 carbon atoms is more preferable.

By use of such a surfactant, the wettability of the surface of the recording material with the recording liquid can be improved and the penetration rate of the recording liquid into the recording material can be increased, so that images with high image quality, high image density and high water resistance can be obtained and high speed recording can be achieved.

Specific examples of dialkylsulfosuccinates represented by formula (1) are shown below in the respective free acid forms:

(1-1)

HO$_3$S—CHCOOCHCH$_2$CHCH$_3$ (with CH$_3$ groups, CH$_2$COOCHCH$_2$CHCH$_3$)

(1-2)

HO$_3$S—CHCOOCHCH$_2$CH$_2$CH$_3$ (CH$_2$COOCHCH$_2$CH$_2$CH$_3$, CH$_3$)

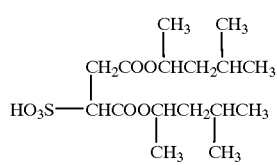

(1-3)

HO$_3$S—CHCOOCH$_2$CH$_2$CH(CH$_3$)$_2$ (CH$_2$COOCH$_2$CH$_2$CH(CH$_3$)$_2$)

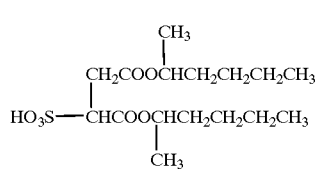

(1-4)

HO$_3$S—CHCOOCHCH(CH$_3$)$_2$ (CH$_2$COOCHCH(CH$_3$)$_2$, CH(CH$_3$)$_2$, CH(CH$_3$)$_2$)

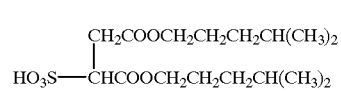

(1-5)

HO$_3$S—CHCOOCH$_2$CH$_2$CH(CH$_3$)$_2$ (CH$_2$COOCH$_2$CH$_2$CH(CH$_3$)$_2$)

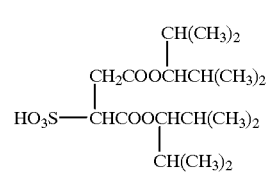

When the dialkylsulfosuccinate represented by formula (1) is used as the surfactant, preferable counter ions therefor to be used are lithium cation, sodium cation, cations represented by formula (6) such as an alkanolamine cation, a quaternary ammonium cation, and a quaternary phosphonium, since when such a counter ion is used, the solubility stability of the image recording acceleration liquid can be significantly improved.

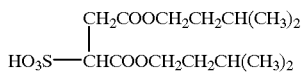

(6)

wherein X is nitrogen or phosphorus, $R^7$, $R^8$, $R^9$, $R^{10}$ are each independently a hydrogen atom, an alkyl group having 1 to 4 carbon atoms, a hydroxyalkyl group or a halogenated alkyl group.

For instance, when as the dialkylsulfosuccinate represented by formula (1), lithium dialkylsulfosuccinate or sodium dialkylsulfosuccinate is used, lithium dialkylsulfosuccinate and sodium dialkylsulfosuccinate can be respectively obtained by adding lithium hydroxide and sodium hydroxide to dialkylsulfosuccinic acid, and when as the dialkylsulfosuccinate represented by formula (1), an alkanolamine dialkylsulfosuccinate, a quaternary ammonium dialkylsulfosuccinate, and a quaternary phosphonium dialkylsulfosuccinate are used, an alkanol-amine dialkylsulfosuccinate, a quaternary ammonium dialkylsulfosuccinate, and a quaternary phosphonium dialkylsulfosuccinate can be obtained by adding hydroxides, for instance, hydroxides of formulae (6-1) to (6-9) as shown below to dialkylsulfosuccinic acid.

(6-1)

[H$_3$C—N(CH$_3$)(CH$_3$)—CH$_3$]$^+$ OH$^-$ (6-2)

[H$_5$C$_2$—N(C$_2$H$_5$)(C$_2$H$_5$)—C$_2$H$_5$]$^+$ OH$^-$ (6-3)

[H$_3$C—N(C$_2$H$_4$OH)(C$_2$H$_4$OH)—CH$_3$]$^+$ OH$^-$

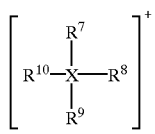

-continued

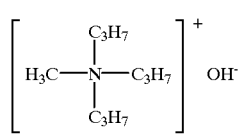

(6-4)

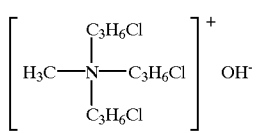

(6-5)

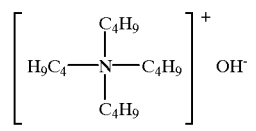

(6-6)

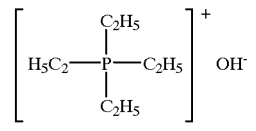

(6-7)

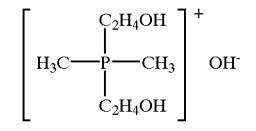

(6-8)

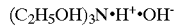

(6-9)

However, it is not always required that all of the counter ions of the dialkylsulfosuccinate represented by formula (1) for use in the present invention be a cation selected from the group consisting of lithium cation, sodium cation, or the cations represented by the above-mentioned formula (6). Other alkali ions may also be used.

Examples of the compound which is capable of making insoluble, for instance, an anionic coloring agent contained in the recording liquid are organic compounds having at least one cationic group, such as polyarylamine and polyethyleneimine; water-soluble multivalent metallic compounds having at least one multivalent metallic ion, such as calcium chloride, calcium hydroxide, calcium nitrate, magnesium hydroxide, magnesium chloride, ammonium alum, and aluminum sulfate; and silica sol which is a dispersion of spherical silica particles with a particle size of about 0.1 μm.

By the addition of any of the above-mentioned compounds, anionic coloring agents such as anionic dyes can be made insoluble, so that recording images with excellent water resistance and high image density can be obtained.

It is preferable that the amount of the above-mentioned compound for making insoluble the coloring agent contained in the recording liquid be in the range of 0.1 to wt. % of the total weight of the image recording acceleration liquid.

The image recording acceleration liquid comprises water as a main liquid medium. To impart the desired physical properties to the image recording acceleration liquid, to prevent the image recording acceleration liquid from drying, and to improve the solubility stability of the surfactant and the compound for making insoluble the coloring agent contained in the recording liquid, and also to stabilize the coating characteristics of the image recording acceleration liquid, the following water-soluble organic solvents can be employed in the image recording acceleration liquid; polyhydric alcohols such as ethylene glycol, diethylene glycol, triethylene glycol, polyethylene glycol, polypropylene glycol, 1,5-pentanediol, 1,6-hexanediol, glycerol, 1,2,6-hexanetriol, 1,2,4-butanetriol, 1,2,3-butanetriol, and 3-methyl-pentane-1,3,5-triol; alkyl ethers derived from polyhydric alcohols such as ethylene glycol monoethyl ether, ethylene glycol monobutyl ether, diethylene glycol monomethyl ether, diethylene glycol monoethyl ether, diethylene glycol monobutyl ether, tetraethylene glycol monoethyl ether, and propylene glycol monoethyl ether; aryl ethers derived from polyhydric alcohols such as ethylene glycol monophenyl ether, and ethylene glycol monobenzyl ether; nitrogen-containing heterocyclic compounds such as N-methyl-2-pyrrolidone, N-hydroxyethyl-2-pyrrolidone, 2-pyrrolidone, 1,3-dimethylimida-zolidinone, and εcaprolactam; amides such as formamide, N-methylformamide, and N,N-dimethylformamide; amines such as monoethanol amine, diethanol amine, triethanol amine, monoethylamine, diethyl amine, and triethyl amine; sulfur-containing compounds such as dimethyl sulfoxide, sulfolane, and thiodiethanol; propylene carbonate; ethylene carbonate; and γ-butyrolactone. These organic solvents can be employed alone or in combination when used together with water.

Of the above water-soluble organic solvents, diethylene glycol, thiodiethanol, polyethylene glycol (200) to (600), triethylene glycol, glycerol, 1,2,6-hexanetriol, 1,2,4-butanetriol, 3-methylpentane-1,3,5-triol, 1,5-pentanediol, N-methyl-2-pyrrolidone, N-hydroxyethyl-2-pyrrolidone, 2-pyrrolidone, and 1,3-dimethylimidazolidinone are particularly preferable for use in the present invention.

This is because by use of these water-soluble organic solvents, the solubility of the compound for making insoluble the coloring agent contained in the recording liquid in the solvent for the image recording acceleration liquid, and the solubility of the surfactant in the solvent for the recording liquid can be highly increased, and the impairment of the recording liquid ejection characteristics, which is caused by the evaporation of a water component from the recording liquid, can be effectively prevented.

In particular, pyrrolidone derivatives such as N-hydroxyethyl-2-pyrrolidone, and diols such as 1,5-pentanediol are suitable solvents for stabilizing the dispersion of the dialkylsulfosuccinate represented by formula (1).

It is also preferable that the image recording acceleration liquid further comprise a monohydric alcohol, since by the addition of a monohydric alcohol to the image recording acceleration liquid, bubbling and non-uniform coating of the image recording acceleration liquid can be effectively prevented, so that by applying the image recording acceleration liquid to the recording material, and then depositing the recording liquid on the recording material with the ejection of the recording liquid in the form of droplets thereto, images with uniform density can be obtained.

It is preferable that the image recording acceleration liquid be deposited in an amount of 0.1 g/m² to 10 g/m² in order to minimize the curling of the recording material.

The coloring agent and the recording liquid which comprises a coloring agent and a solvent for dissolving or dispersing the coloring agent for use in the image recording method and the image recording apparatus for use in the present invention will now be explained.

As the coloring agent for use in the present invention, water-resistant and liquid-resistant water-soluble dyes are suitable, which can be classified into acid dye, direct dye, basic dye, reactive dye and food dye in accordance with the color index numbers thereof.

Specific examples of acid dyes and food dyes are as follows:

C.I. Acid Yellow 17, 23, 42, 44, 79, 142;

C.I. Acid Red 1, 8, 13, 14, 18, 26, 27, 35, 37, 42, 52, 82, 87, 89, 92, 97, 106, 111, 114, 115, 134, 186, 249, 254, 289;

C.I. Acid Blue 9, 29, 45, 92, 249;

C.I. Acid Black 1, 2, 7, 24, 26, 94;

C.I. Food Yellow 3, 4;

C.I. Food Red 7, 9, 14; and

C.I. Food Black 1, 2.

Specific examples of direct dyes are as follows:

C.I. Direct Yellow 1, 12, 24, 26, 33, 44, 50, 86, 120, 132, 142, 144;

C.I. Direct Red 1, 4, 9, 13, 17, 20, 28, 31, 39, 80, 81, 83, 89, 225, 227;

C.I. Direct Orange 26, 29, 62, 102;

C.I. Direct Blue 1, 2, 6, 15, 22, 25, 71, 76, 79, 86, 87, 90, 98, 163, 165, 199, 202; and C.I. Direct Black 19, 22, 32, 38, 51, 56, 71, 74, 75, 77, 154, 168, 171.

Specific examples of basic dyes are as follows:

C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91;

C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112;

C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155; and C.I. Basic Black 2, 8.

Specific examples of reactive dyes are as follows:

C.I. Reactive Black 3, 4, 7, 11, 12, 17;

C.I. Reactive Yellow 1, 5, 11, 13, 14, 20, 21, 22, 25, 40, 47, 51, 55, 65, 67;

C.I. Reactive Red 1, 14, 17, 25, 26, 32, 37, 44, 46, 55, 60, 66, 74, 79, 96, 97; and C.I. Reactive Blue 1, 2, 7, 14, 15, 23, 32, 35, 38, 41, 63, 80, 95.

Of these dyes, anionic acid dyes and direct dyes are preferably employed in the present invention. It is also preferable to use dyes which are developed for use in ink-jet printing. Examples of such dyes are Projet Fast Black 2, Projet Fast Cyan 2, Projet Fast Magenta 2, and Projet Fast Yellow 2 (made by Zeneca K.K.).

The recording liquid comprises water as a main liquid medium. To impart the desired physical properties to the recording liquid, to prevent the recording liquid from drying, and to improve the solubility stability of the coloring agent in the recording liquid, the same water-soluble organic solvents employed in the image recording acceleration liquid can also be employed in the recording liquid.

Of the water-soluble organic solvents, diethylene glycol, thiodiethanol, polyethylene glycol (200) to (600), triethylene glycol, glycerol, 1,2,6-hexanetriol, 1,2,4-butanetriol, 3-methylpentane-1,3,5-triol, 1,5-pentanediol, N-methyl-2-pyrrolidone, N-hydroxyethyl-2-pyrrolidone, 2-pyrrolidone, and 1,3-dimethylimidazolidinone are particularly preferable for use in the present invention.

This is because by use of these water-soluble organic solvents, the solubility of the coloring agent in the solvent for the recording liquid can be highly increased, and the impairment of the recording liquid ejection characteristics, which is caused by the evaporation of a water component from the recording liquid, can be effectively prevented.

In particular, pyrrolidone derivatives such as N-hydroxyethylpyrrolidone are suitable solvents for the above-mentioned purposes.

Furthermore, the above-mentioned surfactants represented by formulae (1) to (5), or other surfactants may be added to the recording liquid, whereby the surface tension of the recording liquid can be adjusted and the penetrability of the recording liquid into the recording material can be improved, and also the wettability of the recording liquid to a head member of an ink-jet printer can be improved so that the ejection stability of the recording liquid can be improved.

In order to adjust the surface tension of the recording liquid, a penetrating agent other than the surfactants can also be added to the recording liquid.

Specific examples of the penetrating agent include alkyl ethers or aryl ethers derived from polyhydric alcohols such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, and tetraethylene glycol chlorophenyl ether; polyoxyethylene polyoxypropylene block copolymer; fluorine-containing surfactants; and lower alcohols such as ethanol and 2-propanol. Of the above penetrating agents, diethylene glycol monobutyl ether is particularly suitable for use in the present invention.

Hydrophobic polymers can also be added to the image recording acceleration liquid or to the recording liquid in order to adjust the viscosity thereof.

Examples of hydrophobic polymers that can be added to the image recording acceleration liquid or to the recording liquid are natural hydrophobic polymers, for example, vegetable polymers such as gum arabic, tragacanth gum, guar gum, karaya gum, locust bean gum, arabinogalactan, pectin, and quince seed starch; seaweed polymers such as alginic acid, carrageenan, and agar; animal polymers such as gelatin, casein, albumin, collagen; microbial polymers such as xanthene and dextran; and shellac; (2) semisynthetic hydrophobic polymers, for example, fiber polymers such as methyl cellulose, ethyl cellulose, hydroxyethyl cellulose, hydroxypropyl cellulose, and carboxymethyl cellulose; starch polymers such as starch sodium glycolate, and starch sodium phosphorate; seaweed-based polymers such as sodium alginate, and propyleneglycol alginate; and (3) synthetic hydrophobic polymers, for example, vinyl polymers such as polyvinyl alcohol, polyvinyl pyrrolidone, and polyvinyl methyl ether; noncrosslinked polyacrylamide; polyacrylic acid and metal salts thereof; acrylic resins such as water-soluble styrene-acrylic resin; water-soluble styrene-maleic acid resin; water-soluble vinylnaphthalene-acrylic resin; water-soluble vinylnaphthalene-maleic acid resin; polyvinyl pyrrolidone; polyvinyl alcohol; an alkaline metal salt of a condensation product of formalin and β-naphthalene-sulfonic acid; and polymeric compounds having as a side chain a salt of a cationic functional group such as quaternary ammonium or amino group.

The image recording acceleration liquid and the recording liquid for use in the present invention may further comprise conventionally known additives such as an antiseptic agent, a mildewproofing agent, a pH adjustor, a chelate reagent, and a corrosion inhibitor.

For instance, sodium dehydroacetate, sodium sorbate, sodium 2-pyridinethiol-1-oxide, sodium benzoate, and sodium pentachlorophenol can be employed as the antiseptic agents and mildewproofing agents.

Any material can be employed as the pH adjustor as long as it has no adverse affects on the image recording acceleration liquid and the recording liquid and the pH thereof can be adjusted to 7 or more. Examples of the pH adjustor for use in the present invention are amines such as diethanolamine and triethanolamine; hydroxides of alkaline metals such as lithium hydroxide, sodium hydroxide and potassium hydroxide; other hydroxides such as ammonium hydroxide, quaternary ammonium hydroxide and quaternary phosphonium hydroxide; and carbonates of alkaline metals such as lithium carbonate, sodium carbonate, and potassium carbonate.

Examples of the chelate reagent for use in the image recording acceleration liquid and the recording liquid are sodium ethylene diamine tetraacetate, sodium nitriletriacetate, sodium hydroxyethyl ethylene diamine triacetate, sodium diethylene triamine pentaacetate, and sodium uramil diacetate.

Examples of the corrosion inhibitor for use in the image recording acceleration liquid and the recording liquid are acid sulfite, sodium thiosulfate, ammon thiodiglycollic acid, diisopropyl ammonium nitrite, pentaerythritol tetranitrate, and dicyclohexyl ammonium nitrite.

Furthermore, the image recording acceleration liquid and the recording liquid may further comprise a water-soluble ultraviolet absorbing agent or a water-soluble infrared absorbing agent.

An image recording apparatus of the present invention will now be explained.

FIG. 1 is a schematic cross-sectional view of an example of the image recording apparatus of the present invention. Means 1 for applying to the recording material the colorless or light colored image recording acceleration liquid for controlling the penetration performance and image fixing performance of the recording liquid which comprises the coloring agent and the solvent for dispersing or dissolving said coloring agent comprises a container 2 for holding the image recording acceleration liquid therein, a scoop-up roller 3 for scooping up the image recording acceleration liquid, an application roller 4 for applying the image recording acceleration liquid to the recording material 6, and a holding roller 5. The recording material 6 is transported from a recording material storing cassette 7 into the above-mentioned means 1 for applying to the recording material the image recording acceleration liquid, and the image recording acceleration liquid is applied to the recording material 6 by the application roller 4. It is preferable that the image recording acceleration liquid be applied in an amount of 0.1 g/m² to 10 g/m² to the recording material 6.

The image recording material 6 to which the image recording acceleration liquid has been applied is then transported to means 10 including a carriage 8 and a printing head 9 for depositing the recording liquid imagewise on the recording material 6 by ejecting the recording liquid in the form of droplets onto the recording material 6, so that an image is formed on the recording material 6 by the printing head 9.

The printing head 9 used in this image recording apparatus has 128 nozzles with a nozzle diameter of 30 μm, using a layered PZT, and is capable of ejecting the recording liquid therefrom, so that images can be formed on the recording material with a picture element density of 600 dpi with a droplet weight of 18 ng. The image printed recording material 6 is then transported onto a discharge roller 11. The method of ejection of the recording liquid in the printing head 9 and the resolution of the printing head 9 are not necessarily limited to the above-mentioned ejection method and the resolution. A printing head capable of ejecting the recording liquid, using thermal energy, can also be employed.

Other features of this invention will become apparent in the course of the following description of exemplary embodiments, which are given for illustration of the invention and are not intended to be limiting thereof.

EXAMPLE 1

[Preparation of Yellow Recording Liquid 1, Magenta Recording Liquid 1, Cyan Recording Liquid 1, and Black Recording Liquid 1]

A yellow recording liquid 1, a magenta recording liquid 1, a cyan recording liquid 1, and a black recording liquid 1 were prepared by separately dissolving each of the following mixtures with the following formulations, and filtering each mixture through a 0.22 μm meshed Teflon filter:

[Formulation of Yellow Recording Liquid 1]

| | Wt. % |
|---|---|
| C.I. Acid Yellow 23 | 1 |
| Projet Fast Yellow 2 | 1 |
| (made by Zeneca K.K.) | |
| Gycerol | 5 |
| N-hydroxyethyl pyrrolidone | 5 |
| Surfactant of formula (4) | 0.1 |
| (p, q = 10) | |
| Sodium 2-pyridinethiol-1-oxide | 0.2 |
| Deionized water | Balance |

[Formulation of Magenta Recording Liquid 1]

| | Wt. % |
|---|---|
| C.I. Acid Red 52 | 1 |
| Projet Fast Magenta 2 | 1 |
| (made by Zeneca K.K.) | |
| Glycerol | 5 |
| N-hydroxyethyl pyrrolidone | 5 |
| Surfactant of formula (4) | 0.1 |
| (p, q = 10) | |
| Sodium 2-pyridinethiol-1-oxide | 0.2 |
| Deionized water | Balance |

[Formulation of Cyan Recording Liquid 1]

| | Wt. % |
|---|---|
| C.I. Acid Blue 9 | 1 |
| Projet Fast Cyan 2 | 1 |
| (made by Zeneca K.K.) | |
| Glycerol | 5 |
| N-hydroxyethyl pyrrolidone | 5 |
| Surfactant of formula (4) | 0.1 |
| (p, q = 10) | |
| Sodium 2-pyridinethiol-1-oxide | 0.2 |
| Deionized water | Balance |

[Formulation of Black Recording Liquid 1]

| | Wt. % |
|---|---|
| C.I. Direct Black 168 | 3 |
| Glycerol | 5 |

-continued

| | Wt. % |
|---|---|
| 2-pyrrolidone | 5 |
| Surfactant of formula (4) (p, q = 10) | 0.1 |
| Sodium 2-pyridinethiol-1-oxide | 0.2 |
| Deionized water | Balance |

[Preparation of Image Formation Acceleration Liquid 1]

A mixture of the following components with the following formulation was stirred, whereby an image formation acceleration liquid 1 was prepared:

| | Wt. % |
|---|---|
| Polyaryl amine | 3 |
| Surfactant of formula (1-1) | 20 |
| 2-propanol | 5 |
| Propylene glycol | 10 |
| 25% aqueous solution of Compound of formula (6-1) | 1 |
| Deionized water | Balance |

Figure 2:
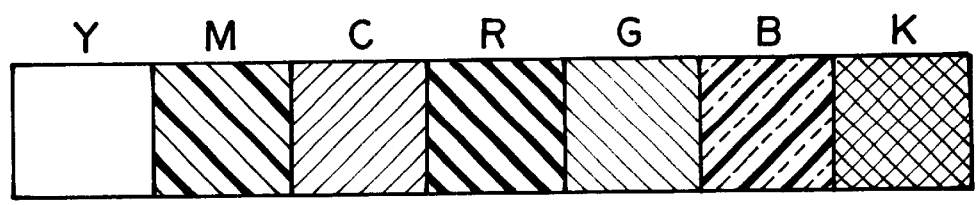
FIG. 2 is a printing test original composed of a printing pattern 1 and a printing pattern 2 for checking image quality produced.
Figure 2:
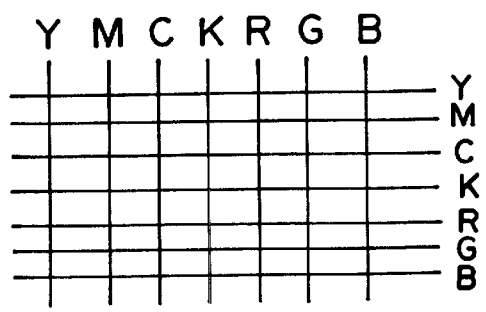

The above prepared image formation acceleration liquid 1 was placed in the container 2 of the above-mentioned image recording apparatus shown in FIG. 1, and the image formation acceleration liquid 1 was applied to a commercially available copy paper and also to a commercially bond paper. On the copy paper and the bond paper, solid images and fine line images were then formed by the image recording apparatus, using a printing pattern 1 and a printing pattern 2 as shown in FIG. 2, and the above prepared yellow recording liquid 1, magenta recording liquid 1, cyan recording liquid 1, and black recording liquid 1, with the same printing head 9 as mentioned above, having 128 nozzles with a nozzle diameter of 30 μm, using a layered PZT, with a picture element density of 600 dpi with a droplet weight of 18 ng. The result was that the images reproduced were excellent in fine line reproduction, and free of spreading of the recording liquids in color boundaries.

In the printing pattern 1 shown in FIG. 2, Y, M, C, R, G, B and K respectively represent a yellow solid image, a magenta solid image, a cyan solid image, a red solid image, a green solid image, a blue solid image, and a black solid image, and in the printing pattern 2 shown in FIG. 2, fine lines with the above-mentioned colors of Y, M, C, R, G, B and K are crossed.

Furthermore, copy samples, each having a solid image in an entire printing possible area thereof, were made. There was observed almost no curling in the thus prepared copy samples.

EXAMPLE 2

[Preparation of Yellow Recording Liquid 2, Magenta Recording Liquid 2, Cyan Recording Liquid 2, and Black Recording Liquid 2]

A yellow recording liquid 2, a magenta recording liquid 2, a cyan recording liquid 2, and a black recording liquid 2 were prepared by separately dissolving each of the following mixtures with the following formulations, and filtering each mixture through a 0.22 μm meshed Teflon filter:

[Formulation of Yellow Recording Liquid 2]

| | Wt. % |
|---|---|
| C.I. Acid Yellow 23 | 1 |
| C.I. Direct Yellow 142 | 1 |
| Glycerol | 5 |
| N-hydroxyethyl pyrrolidone | 5 |
| Surfactant of formula (3) ($R^5 = C_9H_{19}$, n = 12) | 0.1 |
| Sodium 2-pyridinethiol-1-oxide | 0.2 |
| Deionized water | Balance |

[Formulation of Magenta Recording Liquid 2]

| | Wt. % |
|---|---|
| C.I. Acid Red 254 | 2 |
| Glycerol | 5 |
| N-hydroxyethyl pyrrolidone | 5 |
| Surfactant of formula (3) ($R^5 = C_9H_{19}$, n = 12) | 0.1 |
| Sodium 2-pyridinethiol-1-oxide | 0.2 |
| Deionized water | Balance |

[Formulation of Cyan Recording Liquid 2]

| | Wt. % |
|---|---|
| C.I. Acid Blue 249 | 2 |
| C.I. Direct Blue 199 | 1 |
| Glycerol | 5 |
| N-hydroxyethyl pyrrolidone | 5 |
| Surfactant of formula (3) ($R^5 = C_9H_{19}$, n = 12) | 0.1 |
| Sodium 2-pyridinethiol-1-oxide | 0.2 |
| Deionized water | Balance |

[Formulation of Black Recording Liquid 2]

| | Wt. % |
|---|---|
| Projet Fast Black 2 | 3 |
| C.I. Acid Yellow 23 | 0.2 |
| Glycerol | 5 |
| 2-pyrrolidone | 5 |
| Surfactant of formula (3) ($R^5 = C_9H_{19}$, n = 12) | 0.1 |
| Sodium 2-pyridinethiol-1-oxide | 0.2 |
| Deionized water | Balance |

[Preparation of Image Formation Acceleration Liquid 2]

A mixture of the following components with the following formulation was stirred, whereby an image formation acceleration liquid 2 was prepared:

|  | Wt. % |
| --- | --- |
| Aluminum Chloride | 3 |
| Surfactant of formula (2) | 20 |
| ($R^3$, $R^4$ = $C_6H_{13}$, n = 7) | |
| 2-propanol | 5 |
| Propylene glycol | 10 |
| Deionized water | Balance |

Printing tests were conducted in the same manner as in Example 1 except that the yellow recording liquid 1, magenta recording liquid 1, cyan recording liquid 1 and black recording liquid 1 employed in Example 1 were respectively replaced with the above prepared yellow recording liquid 2, magenta recording liquid 2, cyan recording liquid 2 and black recording liquid 2. The result was that the images reproduced were excellent in fine line reproduction, and free of spreading of the recording liquids in color boundaries. Furthermore, copy samples, each having a solid image in an entire printing possible area thereof, were made. There was observed almost no curling in the thus prepared copy samples.

EXAMPLE 3

[Preparation of Yellow Recording Liquid 3, Magenta Recording Liquid 3, Cyan Recording Liquid 3, and Black Recording Liquid 3]

A yellow recording liquid 3, a magenta recording liquid 3, a cyan recording liquid 3, and a black recording liquid 3 were prepared by separately dissolving each of the following mixtures with the following formulations, and filtering each mixture through a 0.22 μm meshed Teflon filter:

[Formulation of Yellow Recording Liquid 3]

|  | Wt. % |
| --- | --- |
| C.I. Acid Yellow 23 | 1 |
| C.I. Direct Yellow 86 | 1 |
| Glycerol | 5 |
| N-hydroxyethyl pyrrolidone | 5 |
| Surfactant of formula (5) | 0.1 |
| ($R^6$ = $C_3H_7$, p, q = 20) | |
| Sodium 2-pyridinethiol-1-oxide | 0.2 |
| Deionized water | Balance |

[Formulation of Magenta Recording Liquid 3]

|  | Wt. % |
| --- | --- |
| C.I. Reactive Red 180 | 2 |
| C.I. Acid Red 52 | 1 |
| Glycerol | 5 |
| N-hydroxyethyl pyrrolidone | 5 |
| Surfactant of formula (5) | 0.1 |
| ($R^6$ = $C_3H_7$, p, q = 20) | |
| Sodium 2-pyridinethiol-1-oxide | 0.2 |
| Deionized water | Balance |

[Formulation of Cyan Recording Liquid 3]

|  | Wt. % |
| --- | --- |
| C.I. Acid Blue 249 | 2 |
| C.I. Reactive Blue 7 | 1 |
| Glycerol | 5 |
| N-hydroxyethyl pyrrolidone | 5 |
| Surfactant of formula (5) | 0.1 |
| ($R^6$ = $C_3H_7$, p, q = 20) | |
| Sodium 2-pyridinethiol-1-oxide | 0.2 |
| Deionized water | Balance |

[Formulation of Black Recording Liquid 3]

|  | Wt. % |
| --- | --- |
| C.I. Food Black 2 | 2 |
| C.I. Direct Black 154 | 1 |
| Glycerol | 5 |
| 2-pyrrolidone | 5 |
| Surfactant of formula (5) | 0.1 |
| ($R^6$ = $C_3H_7$, p, q = 20) | |
| Sodium 2-pyridinethiol-1-oxide | 0.2 |
| Deionized water | Balance |

[Preparation of Image Formation Acceleration Liquid 3]

A mixture of the following components with the following formulation was stirred, whereby an image formation acceleration liquid 3 was prepared:

|  | Wt. % |
| --- | --- |
| Silica sol dispersion | 40 |
| (Solid content: 5%) | |
| Surfactant of formula (3) | 20 |
| ($R^5$ = $C_9H_{19}$, n = 12) | |
| 2-propanol | 5 |
| Propylene glycol | 10 |
| Deionized water | Balance |

Printing tests were conducted in the same manner as in Example 1 except that the yellow recording liquid 1, magenta recording liquid 1, cyan recording liquid 1 and black recording liquid 1 employed in Example 1 were respectively replaced with the above prepared yellow recording liquid 3, magenta recording liquid 3, cyan recording liquid 3 and black recording liquid 3. The result was that the images reproduced were excellent in fine line reproduction, and free of spreading of the recording liquids in color boundaries. Furthermore, copy samples, each having a solid image in an entire printing possible area thereof, were made. There was observed almost no curling in the thus prepared copy samples.

Comparative Example 1

The procedure for the formation of color images in Example 1 was repeated except that the image recording acceleration liquid was not applied to any recording material. The result was that spreading of the recording liquids was observed in the color boundaries, and also in two color-superimposed line portions. Furthermore, when copy samples, each having a solid image in an entire printing possible area thereof, were made, curling was observed in the thus prepared copy samples.

Comparative Example 2

The procedure for the formation of color images in Example 2 was repeated except that the image recording acceleration liquid was not applied to any recording material. The result was that spreading of the recording liquids was observed in the color boundaries, and also in single color line portions and two color-superimposed line portions.

Comparative Example 3

The procedure for the formation of color images in Example 3 was repeated except that the image recording acceleration liquid was not applied to any recording material. The result was that spreading of the recording liquids was observed in the color boundaries, and also in two color-superimposed line portions.

(1) Evaluation of "Strike through" and Image Density

The color images formed on the commercially available copy papers and bond papers in Examples 1 to 3 and Comparative Examples 1 to 3 were evaluated with respect to the "strike through" and the image density thereof. The results are shown in TABLE 1, in which Mark "○" denotes that the image density was more than 1 and the image was free of the "strike through"; mark "Δ" denotes that the image density was in the range of 0.8 to 1 and the "strike through" was slight in the image; and mark "x" denotes that the image density was less than 0.8 and the "strike through" was excessive in the image.

(2) Evaluation of Water Resistance of Image

Test samples of the color image bearing copy papers and bond papers prepared in Examples 1 to 3 and Comparative Examples 1 to 3 were immersed in water at 30° C. for 1 minute, and the image density before the water immersion thereof and that after the water immersion were measured by use of a Macbeth densitomer, and the water resistance of the image was determined in terms of the fading ratio by percentage in accordance with the following formula:

Fading ratio (%)=[1 - (Image density after water immersion/Image density before water immersion)]× 100%

The results are shown in TABLE 1 in which mark "○" denotes that the fading ratio was less than 5%; mark "Δ" denotes that the fading ratio was more than 5%, but less than 10%; and mark "x" denotes that the fading ratio was more than 30%.

TABLE 1

| Example | Recording Liquids | "Strike through" & Image Density | Water Resistance |
|---|---|---|---|
| Example 1 | Yellow 1 | ○ | ○ |
|  | Magenta 1 | ○ | ○ |
|  | Cyan 1 | ○ | ○ |
|  | Black 1 | ○ | ○ |
| Example 2 | Yellow 2 | ○ | ○ |
|  | Magenta 2 | ○ | ○ |
|  | Cyan 2 | ○ | ○ |
|  | Black 2 | ○ | ○ |
| Example 3 | Yellow 3 | ○ | ○ |
|  | Magenta 3 | ○ | ○ |
|  | Cyan 3 | ○ | ○ |
|  | Black 3 | ○ | ○ |
| Comparative Example 1 | Yellow 1 | ○ | X |
|  | Magenta 1 | ○ | X |
|  | Cyan 1 | Δ | X |
|  | Black 1 | ○ | X |
| Comparative Example 2 | Yellow 2 | X | X |
|  | Magenta 2 | Δ | X |
|  | Cyan 2 | ○ | X |
|  | Black 2 | Δ | Δ |
| Comparative Example 3 | Yellow 3 | ○ | Δ |
|  | Magenta 3 | ○ | X |
|  | Cyan 3 | ○ | X |
|  | Black 3 | ○ | Δ |

The above results indicate that the images formed in Examples 1 to 3 of the present invention have high image density and excellent water resistance and are free of the "strike through", while the images formed in Comparative Examples 1 to 3 are poor in water resistance and the "strike through" was observed in the images.

Japanese Patent Application No. 09-084532 filed Mar. 17, 1997 is hereby incorporated by reference.

What is claimed is:

1. An image recording method for forming an image on a recording material comprising the steps of:

applying to a recording material a colorless or light colored image recording acceleration liquid comprising a compound which is capable of making insoluble a coloring agent contained in a recording liquid which comprises said coloring agent and a solvent for dispersing or dissolving said coloring agent, and depositing said recording liquid imagewise on said recording material by ejecting said recording liquid in the form of droplets onto said recording material, said image recording acceleration liquid further comprising at least one of surfactants represented by any of formulae (1) to (5):

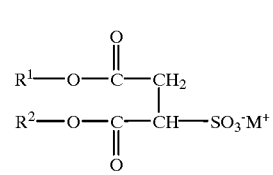

(1)

wherein $R^1$ and $R^2$ are each independently an alkyl group having at least 3 carbon atoms, which may be branched; and $M^+$ is a cation selected from the group consisting of an alkali metal cation, ammonium cation, an alkanolamine cation, a quaternary ammonium cation and a quaternary phosphonium cation,

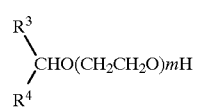

(2)

wherein $R^3$ and $R^4$ are each independently an alkyl group having 5 to 7 carbon atoms, and m is an integer of 5 to 20, (3)

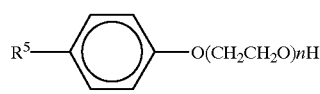

wherein $R^5$ is an alkyl group having 6 to 14 carbon atoms, which may be branched, and n is an integer of 5 to 20, (4)

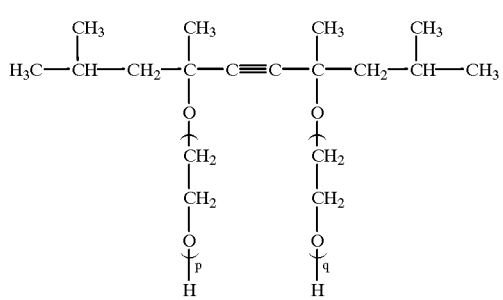

wherein p and q are each independently an integer of 0 to 20, and (5)

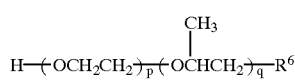

wherein $R^6$ is an alkyl group having 6 to 14 carbon atoms, which may be branched, and p and q are each independently an integer of 0 to 20.

2. The image recording method as claimed in claim 1, wherein said recording liquid exhibits a contact angle of 90° or less with respect to said recording material after said image recording acceleration liquid has been applied to said recording material.

3. The image recording method as claimed in claim 1, wherein said recording liquid is applied in a deposition amount of 0.1 g/m² to 10 g/m² to said recording material.

4. An image recording apparatus for forming an image on a recording material comprising:

means for applying to a recording material a colorless or light colored image recording acceleration liquid for controlling the penetration performance and image fixing performance of a recording liquid which comprises a coloring agent and a solvent for dispersing or dissolving said coloring agent, and means for depositing said recording liquid imagewise on said recording material by ejecting said recording liquid in the form of droplets onto said recording material, said image recording acceleration liquid comprising (a) a compound which is capable of making insoluble said coloring agent contained in said recording liquid and (b) at least one of surfactants represented by any of formulae (1) to (5):

(1)

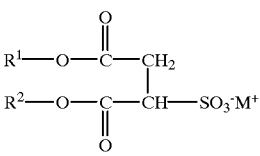

wherein $R^1$ and $R^2$ are each independently an alkyl group having at least 3 carbon atoms, which may be branched; and $M^+$ is a cation selected from the group consisting of an alkali metal cation, ammonium cation, an alkanolamine cation, a quaternary ammonium cation and a quaternary phosphonium cation, (2)

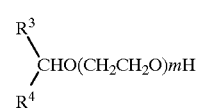

wherein $R^3$ and $R^4$ are each independently an alkyl group having 5 to 7 carbon atoms, and m is an integer of 5 to 20, (3)

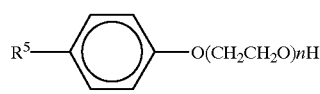

wherein $R^5$ is an alkyl group having 6 to 14 carbon atoms, which may be branched, and n is an integer of 5 to 20, (4)

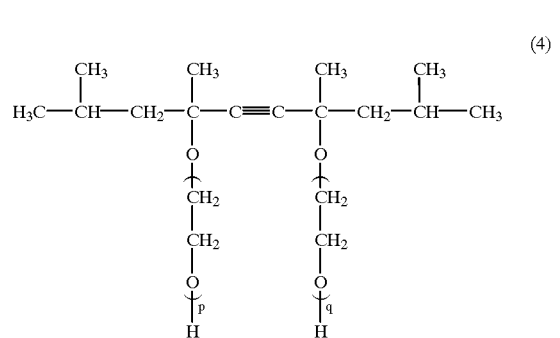

wherein p and q are each independently an integer of 0 to 20, and (5)

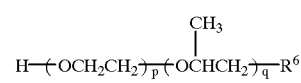

wherein wherein $R^6$ is an alkyl group having 6 to 14 carbon atoms, which may be branched, and p and q are each independently an integer of 0 to 20.

5. The image recording apparatus as claimed in claim 4, wherein said recording liquid exhibits a contact angle of 90° or less with respect to said recording material after said image recording acceleration liquid has been applied to said recording material.

6. The image recording apparatus as claimed in claim 4, wherein said recording liquid is applied in a deposition amount of 0.1 g/m² to 10 g/m² to said recording material.

7. An image recording acceleration liquid comprising:

(a) a compound which is capable of making insoluble a coloring agent contained in a recording liquid comprising said coloring agent and a solvent capable of dispersing or dissolving said coloring agent, (b) at least one of surfactants represented by any of formulae (1) to (5):

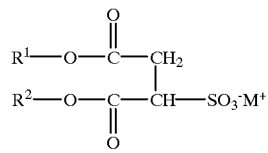
(1)

wherein $R^1$ and $R^2$ are each independently an alkyl group having at least 3 carbon atoms, which may be branched; and $M^-$ is a cation selected from the group consisting of an alkali metal cation, ammonium cation, an alkanolamine cation, a quaternary ammonium cation and a quaternary phosphonium cation,

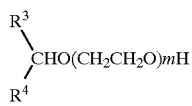
(2)

wherein $R^3$ and $R^4$ are each independently an alkyl group having 5 to 7 carbon atoms, and m is an integer of 5 to 20,

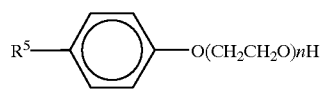
(3)

wherein $R^5$ is an alkyl group having 6 to 14 carbon atoms, which may be branched, and n is an integer of 5 to 20,

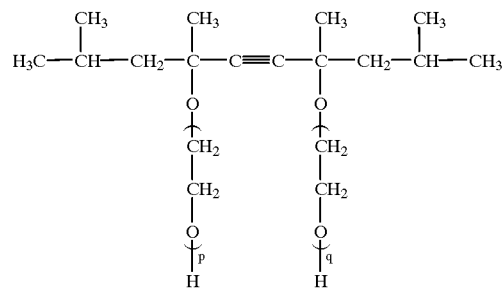
(4)

wherein p and q are each independently an integer of 0 to 20, and

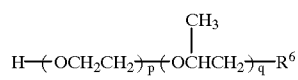
(5)

wherein wherein $R^6$ is an alkyl group having 6 to 14 carbon atoms, which may be branched, and p and q are each independently an integer of 0 to 20, and (c) a solvent capable of dispersing or dissolving said compound and said surfactant.

8. The image recording acceleration liquid as claimed in claim 7, further comprising a monohydric alcohol.

9. The image recording acceleration liquid as claimed in claim 7, wherein said coloring agent contained in said recording liquid is an anionic coloring agent, and said compound which is capable of making insoluble said coloring agent is an organic compound having at least one cationic group.

10. The image recording acceleration liquid as claimed in claim 8, wherein said coloring agent contained in said recording liquid is an anionic coloring agent, and said compound which is capable of making insoluble said coloring agent is an organic compound having at least one cationic group.

11. The image recording acceleration liquid as claimed in claim 7, wherein said coloring agent contained in said recording liquid is an anionic coloring agent, and said compound when is capable of making insoluble said coloring agent is a water-soluble multivalent metallic compound having at least one multivalent metallic ion.

12. The image recording acceleration liquid as claimed in claim 8, wherein said coloring agent contained in said recording liquid is an anionic coloring agent, and said compound which is capable of making insoluble said coloring agent is a water-soluble multivalent metallic compound having at least one multivalent metallic ion.

* * * * *